June 23, 1931.   A. A. ANDRAKE   1,811,659
FUEL TANK AND METHOD OF MAKING THE SAME
Filed Aug. 31, 1927   2 Sheets-Sheet 2

INVENTOR
Andrew A. Andrake
BY
Kwis Hudson & Kent
ATTORNEYS

Patented June 23, 1931

1,811,659

UNITED STATES PATENT OFFICE

ANDREW A. ANDRAKE, OF CLEVELAND, OHIO, ASSIGNOR TO THE GLENN L. MARTIN COMPANY, OF CLEVELAND, OHIO, A CORPORATION OF OHIO

FUEL TANK AND METHOD OF MAKING THE SAME

Application filed August 31, 1927. Serial No. 216,559.

This invention relates to improvements in tanks built of aluminum alloy for the storage of petroleum products. It has special reference to a means for sealing the joints of such tanks.

The desirability of aluminum alloy as a material from which to build fuel tanks for aircraft has long been recognized on account of its high strength-weight ratio, but serious practical difficulties have been encountered in previous attempts to use this material, particularly when machine-production methods have been employed. Welding has been found to produce gasoline tight joints in such tanks, but it weakens the material in the region of the weld. Riveting alone has not proven satisfactory.

Objects of the present invention are to eliminate the welding operation in the fabrication of aluminum alloy tanks and to substitute therefor a more effective method of of sealing the joints which will make them permanently tight against leakage of petroleum products.

Another object is the provision of a method for forming such joints which shall not require great skill on the part of the workmen and shall, therefore, be suitable for use in quantity production.

Another object is the provision by chemical means of a sealing compound which shall serve to fill the interstices of the joints and which may be applied to the joints from the inside of the tank after the latter is built.

Other objects and features of novelty will appear as I proceed with the description of that embodiment of the invention which, for the purposes of the present application, I have illustrated in the accompanying drawings, in which Fig. 1 is a perspective view of a tank embodying the invention;

Similar reference characters refer to like parts throughout the views.

Figure 1:
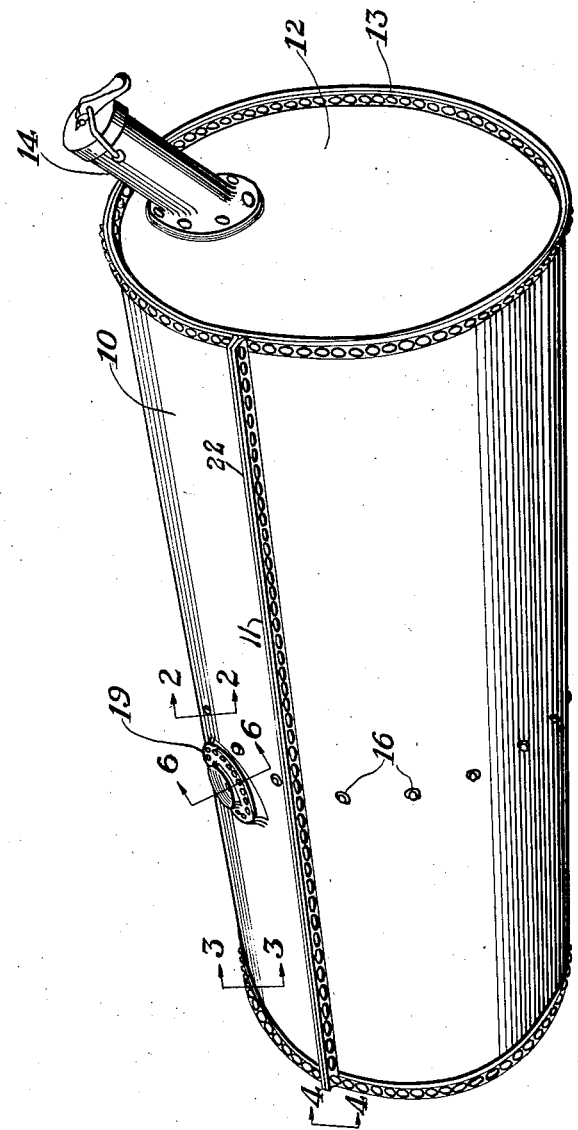
Figure 2:
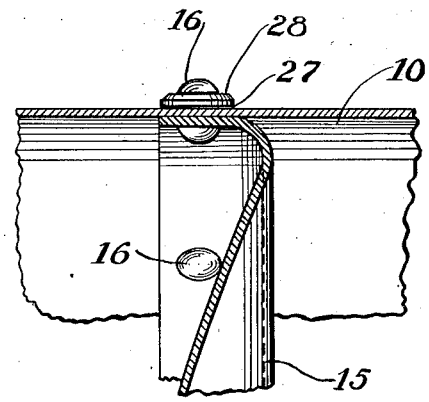
Fig. 2 is a fragmental longitudinal sectional view taken substantially on the line 2—2 Fig. 1.
Figure 3:
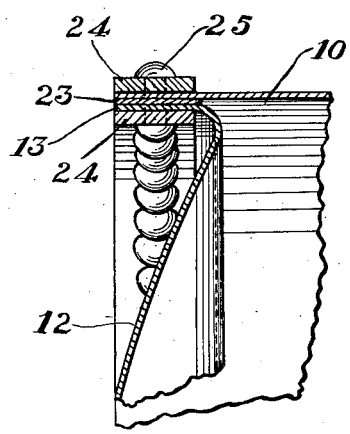
Fig. 3 is a fragmental longitudinal sectional view taken on the line 3—3 Fig. 1.
Figure 4:
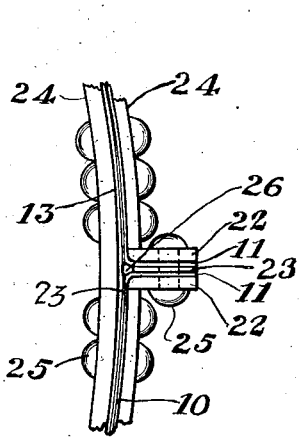
Fig. 4 is a fragmental end view taken on the line 4—4 Fig. 1.
Figure 5:
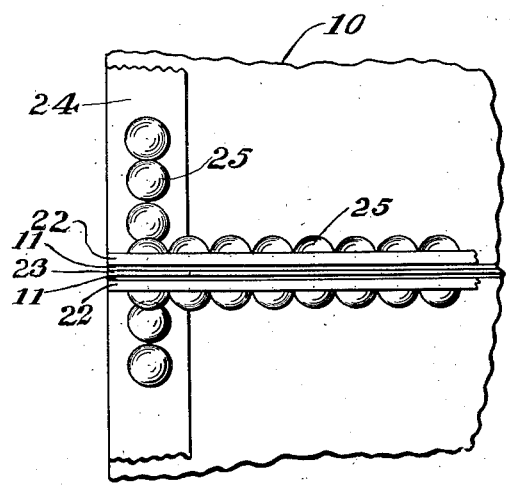
Fig. 5 is a fragmental side view of the tank corresponding to Fig. 4.
Figure 6:
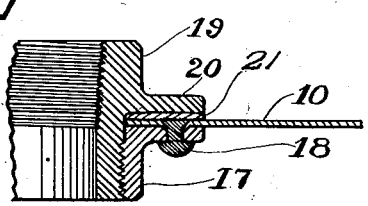
Fig. 6 is a fragmental section of the tank showing a bung hole therein, this section being taken on the line 6—6 Fig. 1.

In the drawings I have shown a tank of cylindrical shape in which the side wall is composed of a sheet 10 of aluminum alloy having flanges 11 at its meeting edges. The end walls are formed of circular plates 12 each of which is flanged at 13 so that it may be set into the cylindrical side wall portion and riveted to the same. One end wall has an inclined filler spout 14 which is flanged and riveted to the plate 12. At the middle, the tank is provided with a bulkhead 15 which is flanged at its periphery and secured in place by rivets 16. In the side wall 10 preferably adjacent the bulkhead 15 a bung hole may be provided with a flanged ring 17 inserted therein and secured to the wall 10 by rivets 18 having countersunk heads. The ring 17 is internally threaded to take a threaded bung ring 19 provided with a flange 20. A washer 21 of tin is clamped between the tank wall 10 and the flange 20 when the bung ring 19 is screwed down tightly.

At each side of the flanges 11 I employ comparatively heavy strips 22 of aluminum alloy and between the flanges 11 I interpose a strip 23 of tin, and a similar strip 23 of tin surrounds the flange 13 of each end plate 12, being located between that flange and the wall 10. Heavy strips 24 of aluminum alloy, similar to the strips 21, are laid upon the remote sides of the flange 13 and the wall 10. Rivets 25 are set as closely together along both of these joints as the use of riveting tools will permit. A plug or filler 26 of tin of a length equal to the width of strips 24 is located in the joint between the strips 22 and 23.

Washers 27 of tin which are positioned between the wall 10 and heavy aluminum alloy washers 28, both washers surrounding the rivets 16.

The drawings, together with the above description, will serve to illustrate at least the majority of the various kinds of joints which will ordinarily be found in fuel tanks and the manner in which my invention may be applied thereto. It is to be borne in mind that heavy reinforcements are desirable upon the remote sides of the two pieces of metal to be joined, that a strip of tin is to be interposed between those pieces, and that all of these elements are to be clamped together tightly which generally will be most conveniently accomplished by the use of rivets closely spaced. After the tank has been assembled in this manner, weak hydrochloric acid, preferably about a 5 percent solution, is put into the tank, being permitted to remain there for ten minutes, more or less, the tank being agitated in the meantime so as to thoroughly flush the solution into all of the joints. The acid acting upon the tin chemically forms stannous chloride, which completely fills the small interstices of the joints. After the acid is removed the tank is washed out with warm water and is then ready for use. The joints are thus sealed from within by a material that is insoluble in gasolene and is, therefore, permanently tight against leakage of petroleum products contained therein.

The words "tin" and "hydorchloric acid" as used in the specification are intended to designate materials which are useful for the purpose of applicant, but any metal which by reaction with an acid produces a salt that is insoluble in a hydrocarbon fluid may be substituted therefor without departing from the spirit of my invention.

Having thus described my invention, I claim:

1. A tank comprising walls of aluminum alloy plates, said tank having joints between said plates containing strips of tin, all of the interstices in said joints being filled with stannous chloride.

2. A tank comprising walls made up of metallic plates, said tank having joints between said plates containing strips of a given metal different from the material of said plates and which is capable of forming hydrocarbon insoluble salts, all of the interstices of said joints being filled with said salt of said strip metal.

3. The method of sealing the joints of a tank comprising walls of aluminum alloy plates, said tank having joints between said plates containing strips of tin, which consists in closing the interstices in said joints with stannous chloride formed by the action of hydrochloric acid temporarily introduced into said tank and thereby into said interstices whereby said joints are rendered tight against leakage of petroleum products.

4. The method of sealing the joints of a tank comprising walls of aluminum alloy plates and outlet fittings attached to said plates, the joints between said plates and said fittings containing rings of tin, which consists in closing the interstices in said joints with stannous chloride produced subsequently to the assembly of said fittings to said plates by the action of hydrochloric acid temporarily introduced into said tank and thereby into said interstices whereby said joints are rendered tight against leakage of petroleum products.

5. The method of sealing the built up joints of a tank fabricated from aluminum alloy sheets with strips of tin inserted between and riveted to said sheets in intimate face to face relation comprising the introduction of hydrochloric acid into said tank and said joints.

6. The method of sealing the built up joints of a tank fabricated from aluminum alloy sheets with strips of metal inserted between and riveted to said sheets in intimate face to face relation comprising the introduction into said tank and said joints of an acid the reaction of which is such as to form a salt of said metal which is insoluble in petroleum products.

In testimony whereof, I hereunto affix my signature.

ANDREW A. ANDRAKE.